(12) United States Patent
Man

(10) Patent No.: US 7,866,845 B2
(45) Date of Patent: Jan. 11, 2011

(54) OPTICAL DEVICE FOR MIXING AND REDIRECTING LIGHT

(75) Inventor: Kwong Man, Vancouver (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 12/282,005

(22) PCT Filed: Mar. 8, 2007

(86) PCT No.: PCT/CA2007/000375
§ 371 (c)(1),
(2), (4) Date: Sep. 8, 2008

(87) PCT Pub. No.: WO2007/104136
PCT Pub. Date: Sep. 20, 2007

(65) Prior Publication Data
US 2010/0265701 A1    Oct. 21, 2010

Related U.S. Application Data

(60) Provisional application No. 60/781,797, filed on Mar. 13, 2006.

(51) Int. Cl.
*F21V 7/04* (2006.01)
(52) U.S. Cl. .................... 362/247; 362/243
(58) Field of Classification Search .......... 362/231, 362/243, 245, 247, 328, 346
See application file for complete search history.

(56) References Cited

U.S. PATENT DOCUMENTS

| 4,188,657 | A | * | 2/1980 | Reibling ............... 362/348 |
|---|---|---|---|---|
| 4,441,783 | A | | 4/1984 | Houghton et al. |
| 4,964,025 | A | | 10/1990 | Smith |
| 5,469,339 | A | | 11/1995 | Iiyama et al. |
| 5,727,108 | A | | 3/1998 | Hed |
| 6,193,392 | B1 | | 2/2001 | Lodhie |
| 6,200,002 | B1 | | 3/2001 | Marshall et al. |
| 6,361,190 | B1 | | 3/2002 | McDermott |
| 6,547,416 | B2 | | 4/2003 | Pashley et al. |
| 2005/0094392 | A1 | | 5/2005 | Mooney |
| 2005/0111220 | A1 | | 5/2005 | Smith |
| 2008/0136334 | A1 | * | 6/2008 | Robinson et al. ............ 315/151 |
| 2009/0303708 | A1 | * | 12/2009 | Holten et al. ............... 362/231 |

* cited by examiner

*Primary Examiner*—David V Bruce

(57) ABSTRACT

The present invention provides an optical device configured for the creation of an asymmetric illumination beam pattern while additionally mixing the light created by two or more light-emitting elements. The optical device comprises a reflector body which extends between an entrance aperture and an exit aperture, wherein the two or more light emitting elements are positioned relative to the entrance aperture and light is reflected within the reflector body exiting at the exit aperture. The reflector body includes a first pair of walls including symmetric reflective elements and a second pair of walls orthogonal to the first pair of walls, wherein the second pair of walls includes asymmetric reflective elements. The first pair of walls provides a means for mixing the light generated by the two of more light-emitting elements and generating a symmetric beam pattern about a first axis. Along a second axis, orthogonal to the first axis, the second pair of walls provides a means for mixing the light generated by the two or more light-emitting elements and generating an asymmetric beam pattern.

14 Claims, 8 Drawing Sheets

OPTICAL DEVICE FOR MIXING AND REDIRECTING LIGHT

CROSS-REFERENCE TO RELATED APPLICATIONS

This application is a national stage application under 35 U.S.C. §371 of International Application No. PCT/CA2007/000375 filed on Mar. 8, 2007 and published in the English language on Sep. 20, 2007 as International Publication No. WO2007/104136, which claims priority to U.S. Provisional Application No. 60/781,797 filed on Mar. 13, 2006, all of which are hereby incorporated herein by reference.

FIELD OF THE INVENTION

The present invention pertains to the field of lighting and in particular to an optical device for mixing and redirecting light.

BACKGROUND

Advances in the development and improvements of the luminous flux of light-emitting devices such as solid-state semiconductor and organic light-emitting diodes (LEDs) have made these devices suitable for use in general illumination applications, including architectural, entertainment, and roadway lighting. Light-emitting diodes are becoming increasingly competitive with light sources such as incandescent, fluorescent, and high-intensity discharge lamps.

One of the problems in designing LED luminaires is the difficulty of evenly illuminating a surface upon which light is directed. For example, when a luminaire is positioned in the vicinity of an upper portion of the surface, it is difficult to illuminate the lower portion of the surface with a brightness that is comparable to that at the upper portion. This problem is likewise similar when the luminaire is positioned in the vicinity of the lower portion of the surface. Furthermore, with particular regard to LEDs, a further requirement is the need for effective colour mixing of the different colours of light emitted by varying types of LEDs, in order to produce a desired uniform colour of light, for example, white light.

U.S. Pat. No. 6,200,002 discloses a light source that includes an array of LEDs in each of a plurality colours such as red, green, and blue in the entrance aperture of a tubular reflector which has convex walls facing the optical axis and flares outward toward the exit aperture. Mixing of the colours of LEDs is defined as being promoted by utilizing a large number of small LEDs with the LEDs of each color being centered on the optical axis. In particular this patent is directed to the mixing of light from a plurality of LEDs, however, it does not address the issue relating to evenly illuminating a surface when the light source is positioned such that it is off set relative to the central region of the surface.

Furthermore, U.S. Pat. No. 6,547,416 discloses a light source that includes an array of LED components in each of a plurality of colors such as red, green, and blue in the entrance aperture of a tubular reflector which has an exit aperture, an optical axis extending between the apertures, and a reflective circumferential wall extending between the apertures to reflect and mix light from the array of LED components. It is defined that at least a portion of the circumferential wall of the reflector body has a polygonal cross-section taken normal to the optical axis, and at least a portion of the cross-section taken parallel to the optical axis includes segments of a curve joined one to the next to form a plurality of facets for reflecting light from the LED components to said exit aperture. This patent is directed to mixing the multiple colours of light in order to create a colour controlled spotlight. However, it does not address the issue relating to being capable of evenly illuminating a surface when the light source is positioned such that it is off set relative to the surface.

An optical device for use with a non-imaging light source is disclosed in U.S. Pat. No. 4,964,025. The optical device is an asymmetric reflecting cup to be used in automobile stop lights. The sides of the cup are different, wherein in cross section, each side contains a circular portion and two different parabolic portions. This configuration of the optical device enables the emission of light in a relatively narrow range of angles, with different horizontal and vertical ranges, such that observers may see the automobile. Again this patent does not address the issues relating to being capable of evenly illuminating a surface when a light source is positioned such that it is off set relative to the surface or mixing multiple colours of light.

U.S. Pat. No. 4,441,783 describes both symmetric and asymmetric compound parabolic concentrators to be used for navigational lights, wherein these lights provide a means for a vessel to be seen and not to illuminate a particular object. The patent describes two geometric configurations for projecting light, namely symmetrical and asymmetrical compound parabolic concentrators, each of which may be constructed as either a reflective cavity or a refractive dielectric, thereby providing four basic designs for achieving uniform luminous intensity over a sharply bounded horizontal arc of visibility, and also for achieving a desired vertical arc of visibility. This patent, however does not address any means for simultaneously mixing different colours of light to create a uniform colour.

In addition, U.S. Pat. No. 5,727,108 discloses a compound parabolic concentrator (CPC) which has a modified prismatic dielectric structure used as the reflecting surface of the CPC which acts as a refractive reflector. The light rays undergo a single reflection from the prismatic surface between the input aperture and the output aperture of the CPC. However, this patent does not address the issue relating to being capable of evenly illuminating a surface when the light source is positioned such that it is off set relative to the surface.

Therefore there is a need for a new optical device that is capable of both enabling substantially even illumination of a surface when the light source is off set relative to the central region of the surface, while additionally providing for a desired level of light mixing in order to generate a uniform colour of light from different coloured light sources.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an optical device for mixing and redirecting light. In accordance with an aspect of the present invention, there is provided an optical device for mixing and redirecting light generated by two or more light-emitting elements, the optical device comprising: an entrance aperture and an exit aperture; and a reflector body extending between the entrance aperture and exit aperture, the reflector body including a first pair of walls positioned orthogonal to a second pair of walls, said first pair of walls comprising symmetrical reflective elements, and said second pair of walls comprising asymmetric reflective elements;

wherein the reflector body is configured to redirect and mix the light generated by the two or more light-emitting elements.

In accordance with another aspect of the present invention there is provided a light source comprising: an array of two of more light-emitting elements for emitting light of one or more colours; an optical device including an entrance aperture, an exit aperture and a reflector body extending between the entrance aperture and the exit aperture, the reflector body including a first pair of walls positioned orthogonal to a second pair of walls, said first pair of walls comprising symmetrical reflective elements, and said second pair of walls comprising asymmetric reflective elements; wherein the array of two or more light-emitting elements are positioned proximate to the entrance aperture and wherein the reflector body is configured to redirect and mix the light generated by the two or more light-emitting elements.

DETAILED DESCRIPTION OF THE INVENTION

Definitions

The term "light-emitting element" is used to define any device that emits radiation in any region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a worker skilled in the art.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention provides an optical device for use with a light source comprising two or more light-emitting elements. The optical device provides for the creation of an asymmetric illumination beam pattern while additionally mixing the light created by the two or more light-emitting elements. The optical device comprises a reflector body which extends between an entrance aperture and an exit aperture, wherein the two or more light emitting elements are positioned relative to the entrance aperture and light is reflected within the reflector body exiting at the exit aperture. The reflector body includes a first pair of walls including symmetric reflective elements and a second pair of walls orthogonal to the first pair of walls, wherein the second pair of walls includes asymmetric reflective elements. The first pair of walls provides a means for mixing the light generated by the two of more light-emitting elements and generating a symmetric beam pattern about a first axis. Along a second axis, orthogonal to the first axis, the second pair of walls provides a means for mixing the light generated by the two or more light-emitting elements and generating an asymmetric beam pattern.

Figure 1:
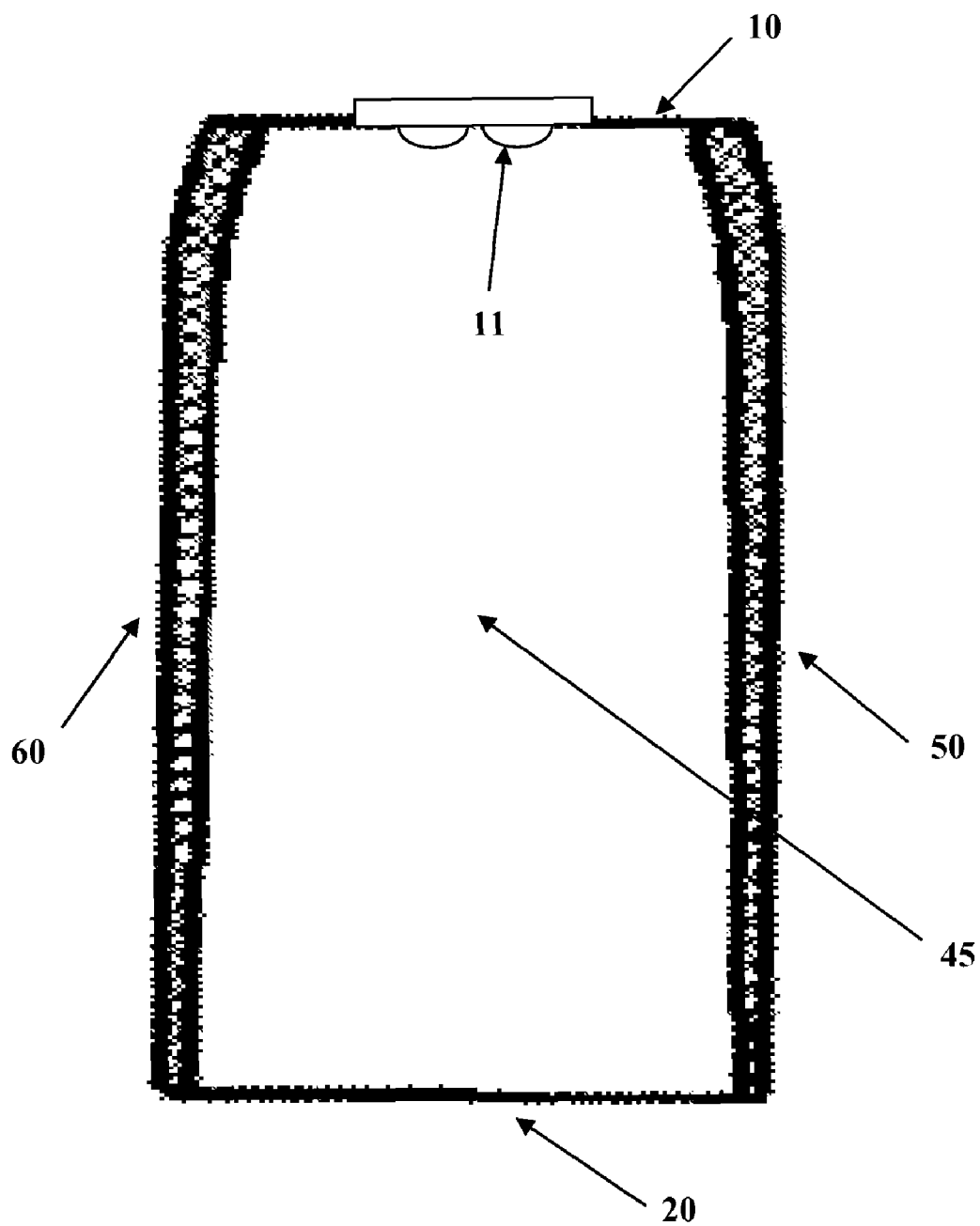
FIG. 1 is a cross sectional view of an optical device according to one embodiment of the present invention, wherein the cross section is taken along a first axis.
Figure 2:
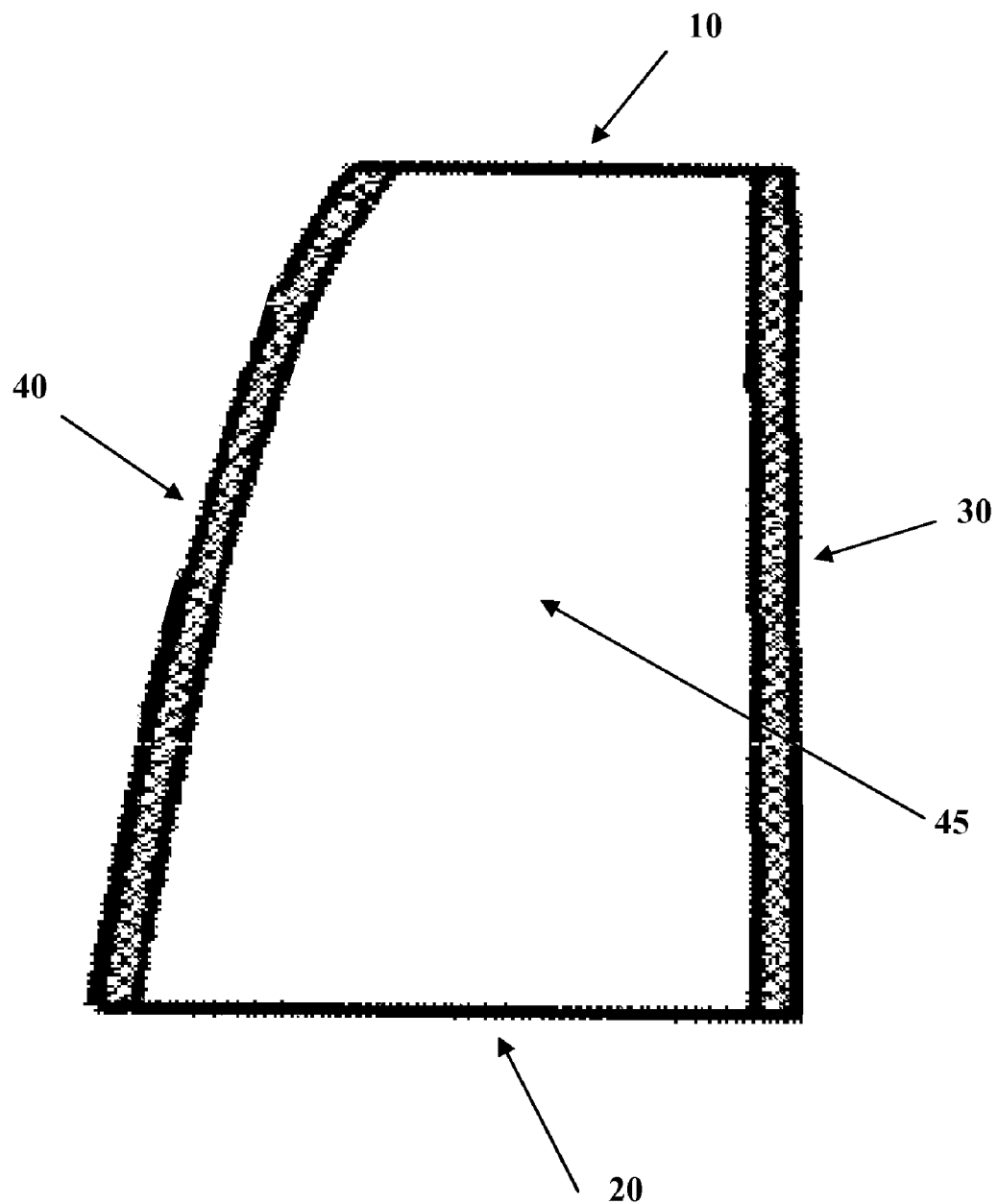
FIG. 2 is a cross sectional view of the optical device of FIG. 1, wherein the cross section is taken along a second axis orthogonal to the first axis.

FIGS. 1 and 2 illustrate orthogonal longitudinal cross sections of an optical device according to one embodiment of the present invention. The optical device comprises an entrance aperture 10, an exit aperture 20 and a light manipulation chamber 45 defined by a substantially square cross sectional reflector body therebetween. As illustrated in FIG. 1, the reflector body comprises a first pair of walls 50 and 60 which are symmetrically configured. In this embodiment the first pair of walls are configured as parabolic reflective elements for mixing the light generated by two or more light-emitting elements positioned at the entrance aperture 10. The symmetrically configured parabolic walls 50 and 60 further provide for a symmetric beam pattern in a first direction being emitted from the exit aperture 20 of the optical device. Two of more light-emitting elements 11 are positioned proximate to the entrance aperture and light emitted thereby is reflected within the reflector body exiting at the exit aperture.

As illustrated in FIG. 2, the reflector body further comprises a second pair of walls 30 and 40 which are asymmetrically configured. Wall 40 is configured as a parabolic reflective element and wall 30 is configured as a planar reflective element, which together provide for the mixing of the light generated by two or more light-emitting elements positioned at the entrance aperture 10. The asymmetrically configured walls 30 and 40 further provide for an asymmetric beam pattern being emitting from the exit aperture 20 of the optical device in a second direction.

Reflector Body

The reflector body comprises a first pair of walls and a second pair of walls oriented orthogonal to each other. The first pair of walls are symmetrically configured and the second pair of walls are asymmetrically configured. Due to the orthogonal orientation of the first and second pairs of walls, the first pair of walls and the second pair of walls are capable of independently adjusting the beam pattern in first and second orthogonal directions, which is emitted from the exit aperture of the optical device. Furthermore, the manipulation chamber defined by the reflector body provides a region for the mixing of the light emitted by the two or more light-emitting elements.

Figure 3:
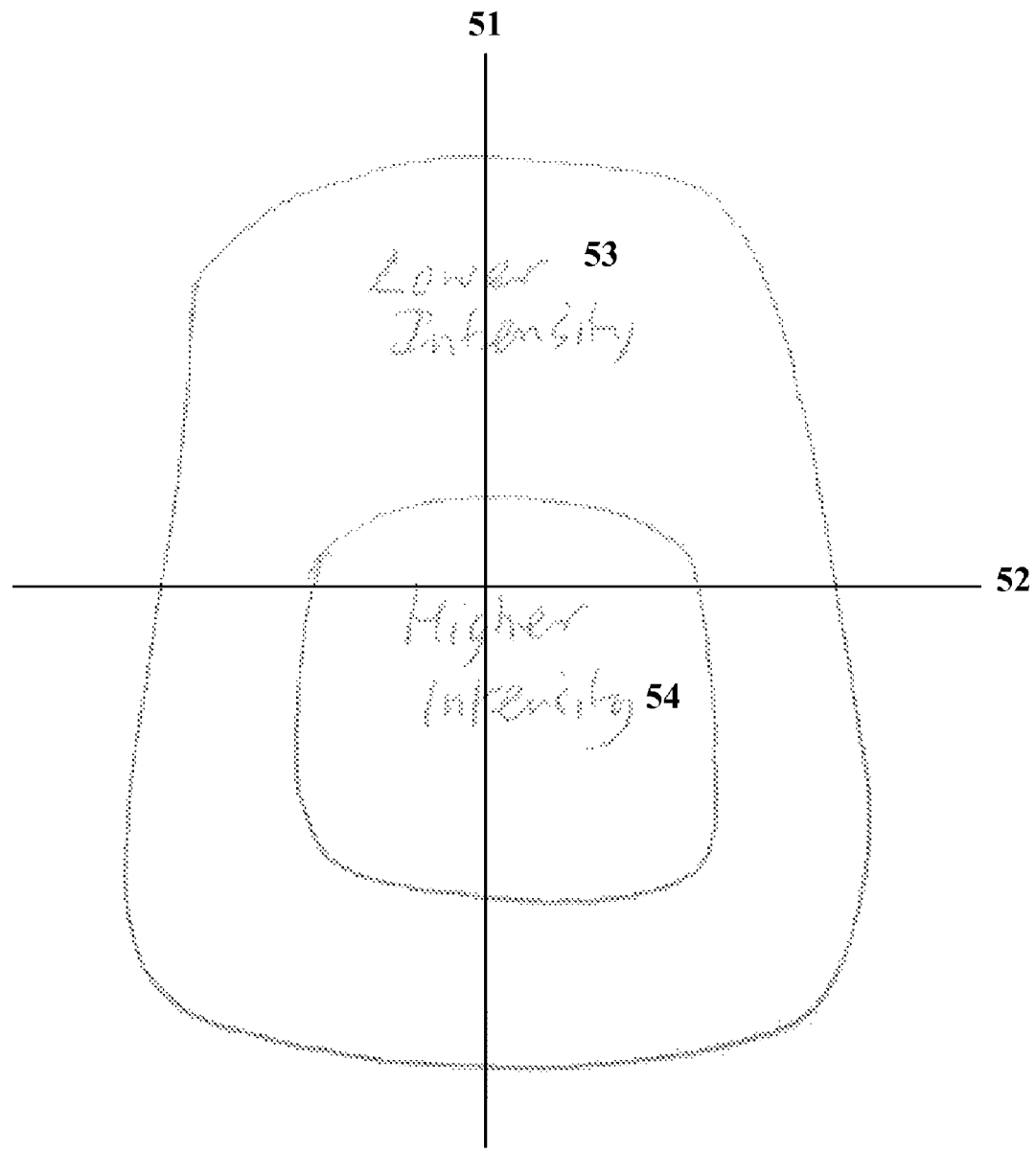
FIG. 3 illustrates a light intensity distribution on a plane parallel to the output plane of an optical device according to one embodiment of the present invention.

The symmetrical pair of walls provides for a symmetrical uniform distribution of mixed light in a first direction. FIG. 3 illustrates an example light intensity distribution on a plane parallel to the output plane of an optical device according to one embodiment of the present invention. As illustrated, the light intensity distribution about line 51 is substantially symmetric.

In one embodiment, a symmetrical light intensity distribution in a first direction can provide a means for horizontally illuminating a surface such that about a uniform brightness is visible in the horizontal direction along the surface.

The asymmetrical pair of walls provides for an asymmetrical distribution of mixed light in second direction orthogonal to the first direction. The asymmetric manipulation of the light in the second direction can provide for the preferential redirection of mixed light into a desired portion of the light intensity distribution. With further reference to FIG. 3, the light intensity distribution about line 52 is asymmetric wherein a higher light intensity 54 relative to a lower light intensity 53, is positioned off the centre line of the light intensity distribution.

In one embodiment, an asymmetric light distribution can provide a means for a substantially even vertical illumination of a surface, when a light source comprising an optical device according to the present invention is positioned in the vicinity of the upper region of the surface. In this example, the lower portion of the surface is a greater distance away from the light source and therefore illumination projected thereto will require a greater intensity in order to illuminate the surface to the same degree as the upper portion of the surface.

A reflective element which forms one or more of the walls of the reflector body, can be configured in a plurality of shapes. For example, the reflective element can be parabolic, hyperbolic, planar, elliptical, an arc of a circle or any other shape desired. As would be known to a worker skilled in the art, there are a plurality of formats for each of the above defined shapes, wherein the format of the shape can be determined based on the desired level of light mixing and manipulation to be provided by the optical device.

In another embodiment, the reflective elements can be formed from two or more planar portions having different slopes, for example a segmented reflective element.

It would be readily understood by a worker skilled in the art that the shape of a reflective element can be determined based on the desired light output pattern from the optical device. For example, the desired light output pattern to be emitted from exit aperture of the optical device can determine the curve of a particular parabola to be used for a reflective element of the reflector body.

In one embodiment of the present invention, the reflective elements of the reflector body are fabricated from a reflective material, for example specular aluminium, a metallised plastic or other form of reflective material as would be readily understood by a worker skilled in the art. As an example, reflective elements fabricated from a specular aluminium material can provide about 95% efficiency of illumination redirection.

In one embodiment of the present invention, the first pair of walls and the second pair of walls define a substantially square cross sectional shaped reflector body.

In an another embodiment of the present invention, the reflector body further comprises a third pair of walls and a fourth pair of walls, thereby resulting in a substantially octagonal cross sectional shaped reflector body. The third and fourth pairs of walls may provide a means for additional mixing of light within the manipulation chamber of the reflector body.

In one embodiment of the present invention, one or more of the reflective elements are combined with one or more refractive elements. The provision of one or more refractive elements together with the reflective elements may provide a means for additional mixing of the light emitted by the two or more light-emitting elements into the reflector body.

Light-Emitting Elements

The two or more light-emitting elements can be selected to provide a predetermined colour of light. The number, type and colour of the light-emitting elements may provide a means for achieving high luminous efficiency, a high colour rendering index (CRI), and a large colour gamut, for example. The two or more light-emitting elements can be manufactured using either organic material, for example OLEDs or PLEDs or inorganic material, for example semiconductor LEDs. The two or more light-emitting elements can be primary light-emitting elements that can emit colours including blue, green, red or other colour. The two or more light-emitting elements can optionally be secondary light-emitting elements, which convert the emission of a primary source into one or more monochromatic wavelengths or quasi-monochromatic wavelengths, for example optically pumped LEDs. Additionally, a combination of primary and/or secondary light-emitting elements can be provided, which can be determined based on the desired light output.

In one embodiment of the present invention the light-emitting elements are selected having spectral outputs centred around wavelengths corresponding to the colours red, green and blue. Optionally, light-emitting elements of other spectral output can additionally be used, for example light-emitting elements radiating at the amber wavelength region or optionally may include one or more light-emitting elements radiating at the cyan wavelength region. The selection of light-emitting elements can be directly related to the desired colour gamut and/or the desired maximum luminous flux and colour rendering index to be created.

Array of Optical Devices

In one embodiment, two or more optical devices according to the present invention can be coupled together in order to form an array of optical devices. The array can be configured as a linear array or a planar array, wherein the configuration of the array can be determined based on the desired light distribution pattern to be generated.

In one embodiment of the present invention, an array of optical devices is configured in order that each of the optical devices within the array has substantially an identical orientation.

In another embodiment of the present invention, the orientation of the optical devices within the array are configured with varying orientation in a predetermined pattern.

In another embodiment of the present invention, the orientation of the optical devices within the array are configured randomly.

In one embodiment of the present invention, multiple arrays of optical devices can be coupled together.

Figure 4:
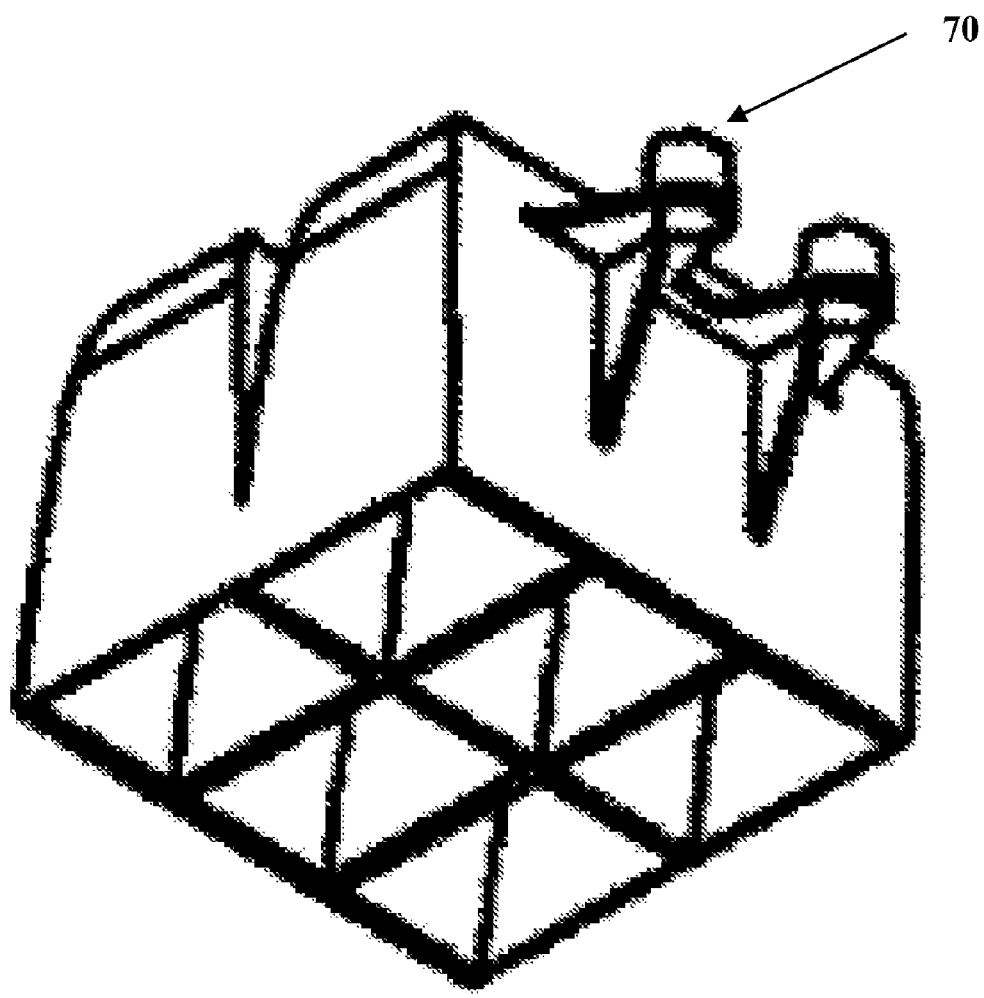
FIG. 4 is a perspective view of an array of optical devices according to one embodiment of the present invention.
Figure 5:
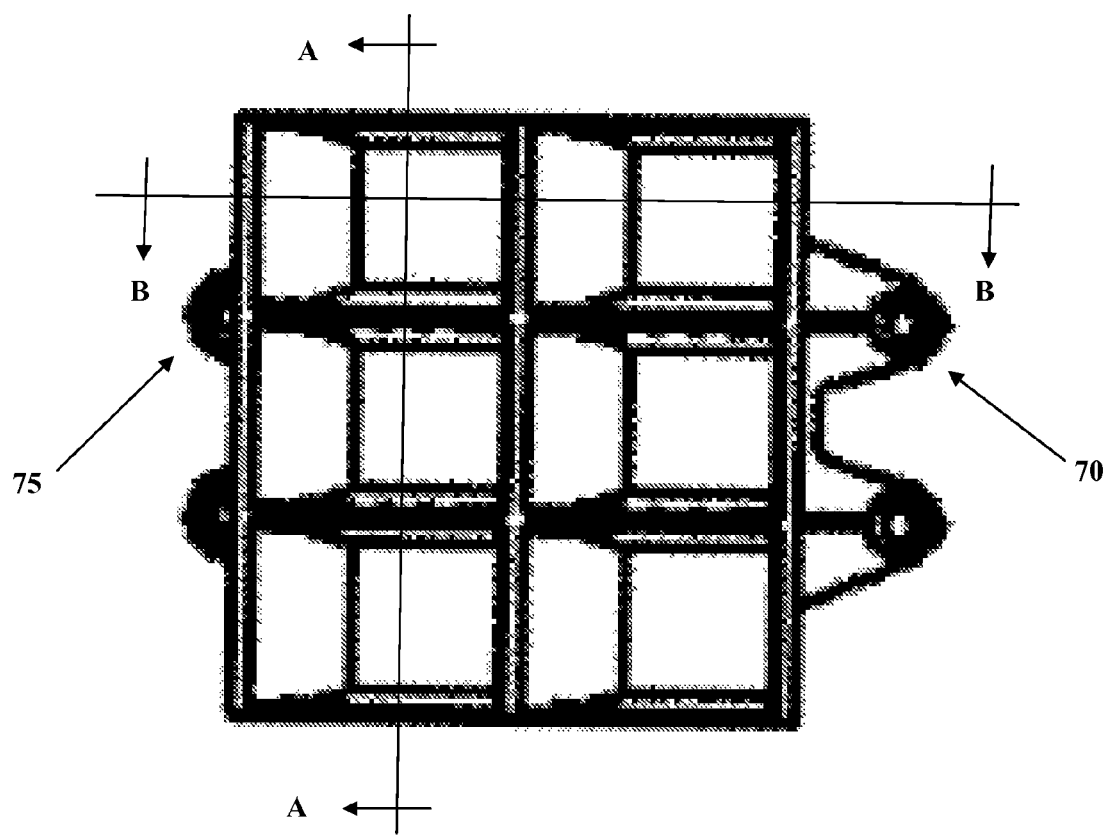
FIG. 5 is a bottom view of the array of optical devices of FIG. 4.
Figure 6:
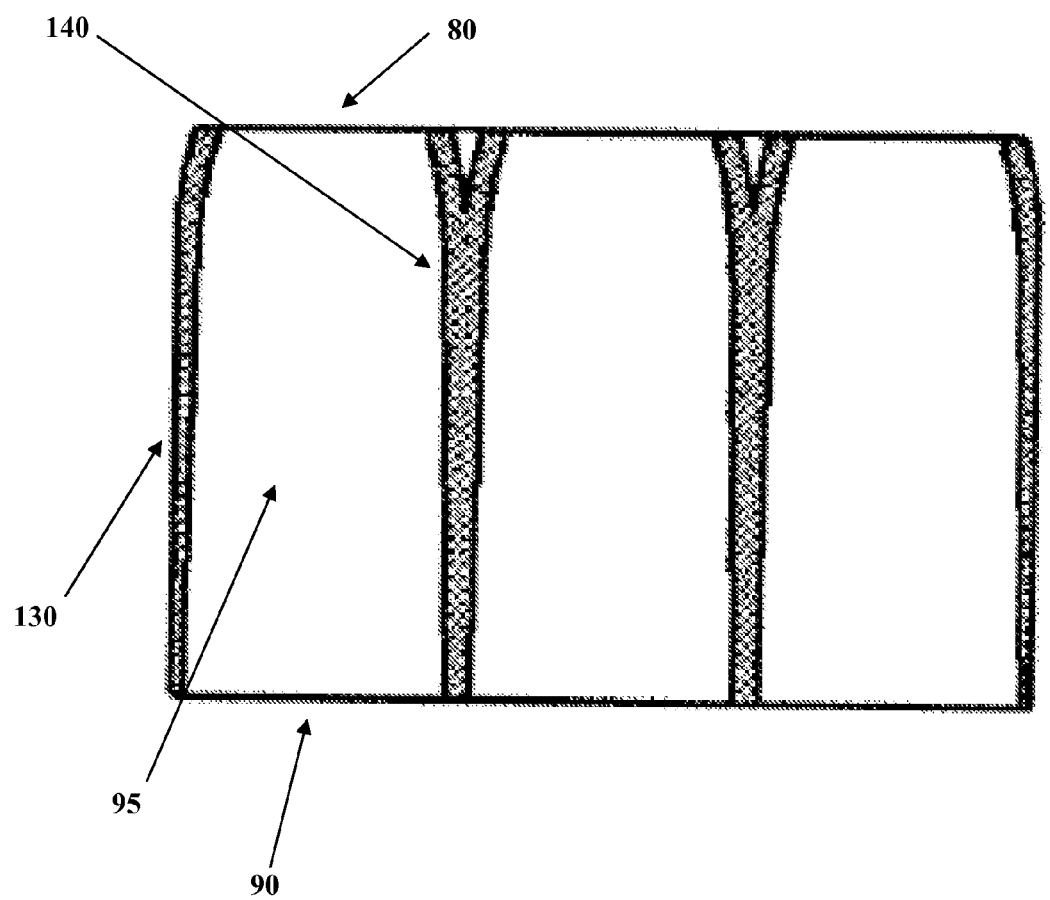
FIG. 6 is a cross sectional view of the array of optical devices of FIG. 4 taken along line A-A.
Figure 7:
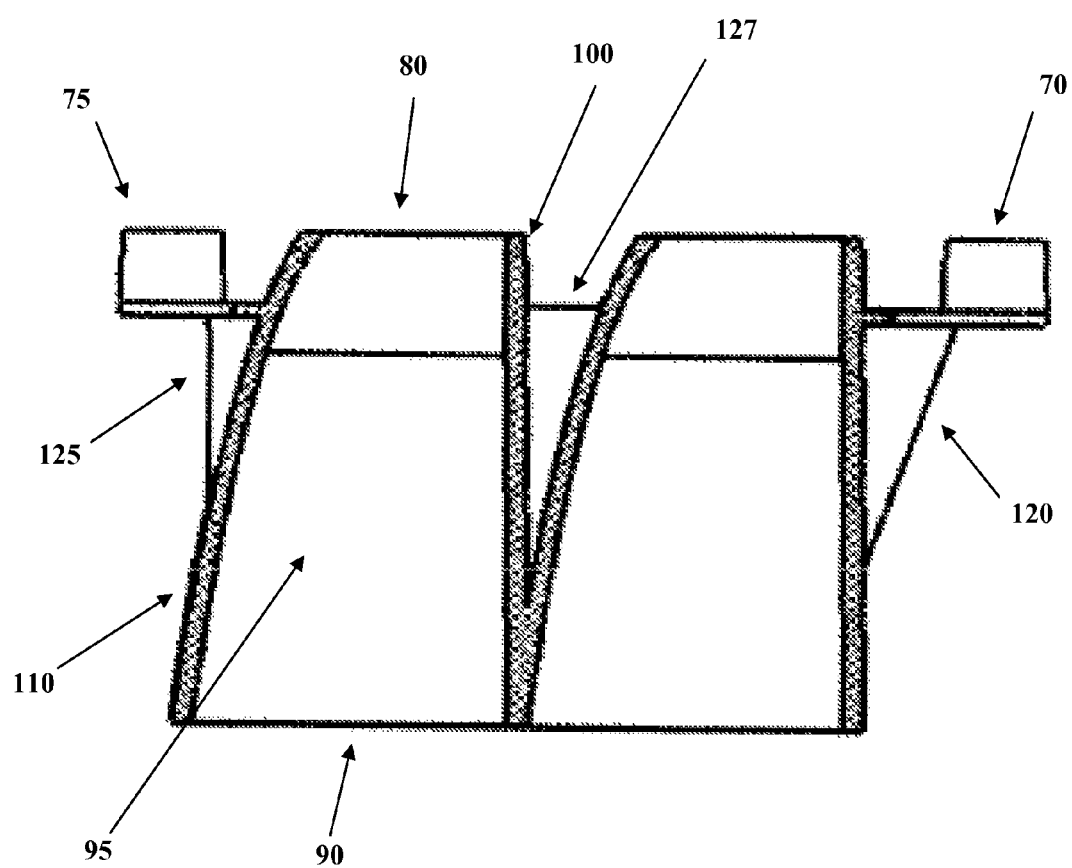
FIG. 7 is a cross sectional view of the array of optical devices of FIG. 4 taken along line B-B.

FIG. 4 illustrates a perspective view of a planar array of optical devices according to one embodiment of the present invention. The planar array is configured as a 2 by 3 array of optical devices. FIG. 5 illustrates a bottom view of the array of FIG. 4. FIGS. 6 and 7 are cross sections of the array taken along lines A-A, and B-B, respectively.

With reference to FIG. 6, the array of optical devices is positioned proximate to a plurality of light-emitting elements such that light from two or more light-emitting elements enters through each of the entrance apertures 80 of each optical devices. Within the light manipulation chamber 95 the light is mixed and symmetrically distributed across the exit aperture 90 by reflective elements 130 and 140, which form the first pair of walls.

With reference to FIG. 7, the second pair of walls 110 and 100 are configured as an asymmetric pair of walls, wherein reflective element 100 is a planar wall and reflective element 110 is a parabolic wall. The array of optical devices can be structurally secured together using one or more support struts 127, thereby forming a substantially rigid array.

In one embodiment, coupling elements 70 and 75 as illustrated in FIG. 7, can provide a means for the mating of adjacent arrays and may additional provide a means for securing the array to a luminaire, for example. Furthermore support elements 120 and 125 can provide structural strength to the coupling elements.

Figure 8:
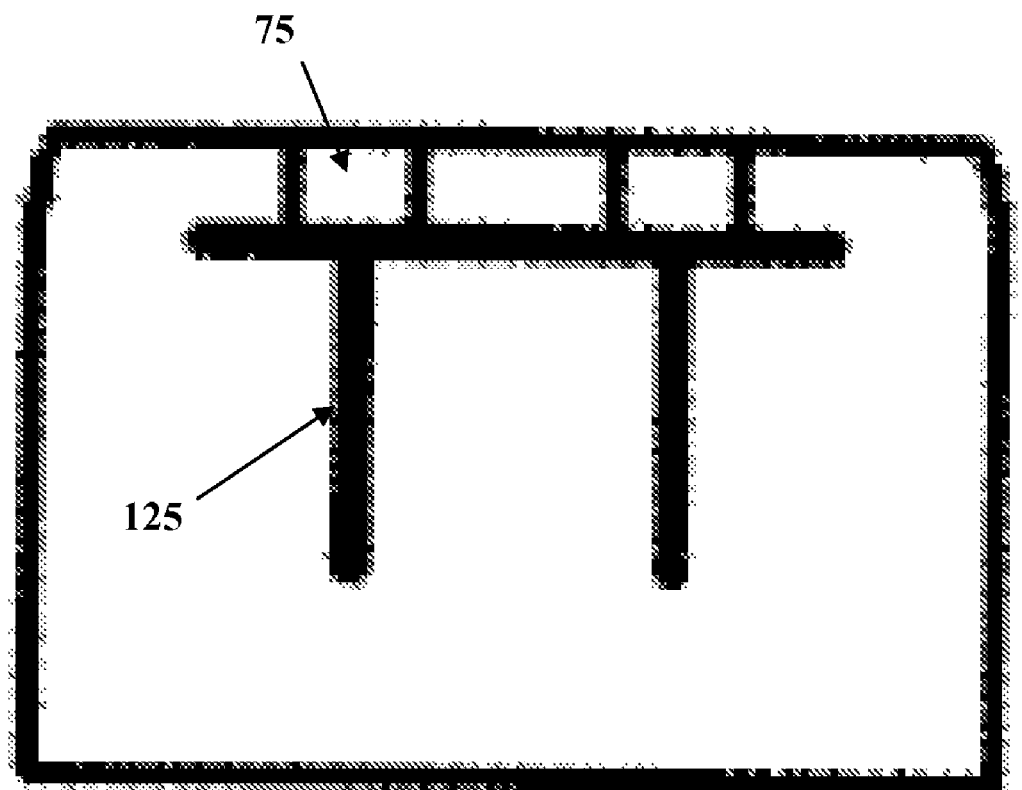
FIG. 8 is an end view of the array of optical devices of FIG. 4.

FIG. 8 illustrates a side view of the array of optical devices according to the embodiment illustrated in FIG. 4.

It is obvious that the foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

I claim:

1. An optical device for mixing and redirecting light generated by two or more light-emitting elements, the optical device comprising: a reflector body defining an entrance aperture and an exit aperture and extending therebetween, the reflector body including a first pair of walls positioned substantially orthogonal to a second pair of walls, said first pair of walls comprising symmetrical reflective elements, and said second pair of walls comprising asymmetric reflective elements; wherein the reflector body is configured to redirect and mix the light generated by the two or more light-emitting elements.

2. The optical device according to claim 1, wherein the symmetrical reflective elements have a shape selected from the group comprising: parabolic, hyperbolic, planar, elliptical and arc of a circle, wherein the shapes are selected to be symmetrical.

3. The optical device according to claim 1, wherein each of the asymmetrical reflective elements have a shape selected from the group comprising: parabolic, hyperbolic, planar, elliptical and arc of a circle, wherein the shapes are selected to be asymmetrical.

4. The optical device according to claim 1, wherein the symmetrical reflective elements are parabolic and the asymmetrical reflective elements include at least one a parabolic element and at least one planar element.

5. The optical device according to claim 1, wherein the symmetrical reflective elements are segmented reflective elements.

6. The optical device according to claim 1, wherein the asymmetrical reflective elements are segmented reflective elements.

7. The optical device according to claim 1, wherein the symmetrical reflective elements further include refractive elements.

8. The optical device according to claim 1, wherein the asymmetrical reflective elements further include refractive elements.

9. The optical device according to claim 1, wherein the reflector body further comprises a third pair of walls and a fourth pair of walls, thereby resulting in the reflector body having a substantially octagonal cross sectional shape.

10. A light source comprising:
 a) an array of two of more light-emitting elements for emitting light of one or more colours;
 b) an optical device including an entrance aperture, an exit aperture and a reflector body extending between the entrance aperture and the exit aperture, the reflector body including a first pair of walls positioned orthogonal to a second pair of walls, said first pair of walls comprising symmetrical reflective elements, and said second pair of walls comprising asymmetric reflective elements;
 wherein the array of two or more light-emitting elements are positioned proximate to the entrance aperture and wherein the reflector body is configured to redirect and mix the light generated by the two or more light-emitting elements.

11. The light source according to claim 10, wherein one or more of the two or more light-emitting elements are primary light-emitting elements.

12. The light source according to claim 11, wherein one or more of the two or more light-emitting elements are secondary light-emitting elements.

13. The light source according to claim 10 comprising three or more light-emitting elements which emit light having colours including red, green and blue.

14. The light source according to claim 13, further comprising light-emitting elements which emit light having colours including cyan and/or amber.

* * * * *